(12) United States Patent
Pedersen et al.

(10) Patent No.: US 10,868,831 B2
(45) Date of Patent: Dec. 15, 2020

(54) AUTHENTICATION OF BASE STATION AND HEADSET

(71) Applicant: Sennheiser Communications A/S, Ballerup (DK)

(72) Inventors: Arne Lindbjerg Pedersen, Ballerup (DK); Johnny Kristensen, Mern (DK); Ole Dahl Spanter, Ballerup (DK)

(73) Assignee: SENNHEISER COMMUNICATIONS A/S, Ballerup (DK)

( * ) Notice: Subject to any disclaimer, the term of this patent is extended or adjusted under 35 U.S.C. 154(b) by 113 days.

(21) Appl. No.: 15/387,174

(22) Filed: Dec. 21, 2016

(65) Prior Publication Data

US 2017/0180990 A1 Jun. 22, 2017

(30) Foreign Application Priority Data

Dec. 22, 2015 (EP) ..................................... 15201959
Apr. 1, 2016 (EP) ..................................... 16163520

(51) Int. Cl.
*H04W 12/06* (2009.01)
*H04L 29/06* (2006.01)
(Continued)

(52) U.S. Cl.
CPC ................ *H04L 63/18* (2013.01); *H04L 9/14* (2013.01); *H04L 63/06* (2013.01); *H04L 63/083* (2013.01);
(Continued)

(58) Field of Classification Search
CPC .. H04W 12/06; H04W 12/04; H04L 63/0428; H04L 63/08; H04L 63/0876; H04L 9/14;
(Continued)

(56) References Cited

U.S. PATENT DOCUMENTS 7,814,538 B2 * 10/2010 Kuehnel ............... H04L 9/3236
726/10
7,822,983 B2 * 10/2010 Aull ........................ G06F 21/35
380/270

(Continued)

FOREIGN PATENT DOCUMENTS

WO WO-2007140342 A2 * 12/2007 ............ H04W 28/22

*Primary Examiner* — Saleh Najjar
*Assistant Examiner* — Khalid M Almaghayreh
(74) *Attorney, Agent, or Firm* — Birch, Stewart, Kolasch & Birch, LLP

(57) ABSTRACT

A communication system for authenticate a second communication device to a first communication device, wherein the communication system comprises a physical connection between a first communication device and a second communication device, where a first message may be transmitted from the first communication device, via the physical connection, to the second communication device. Furthermore, the communication system comprises a non-physical connection between the first communication device and the second communication device, where a second message may be transmitted from the first communication device, via the non-physical connection, to the second communication device, and wherein the second communication device may be configured to evaluate the first message and the second message based on a matching criteria, and if the evaluation of the first message and the second message fulfills the matching criteria then the second communication device may be configured to transmit an acceptance to the first communication device.

16 Claims, 6 Drawing Sheets

(51) Int. Cl.
*H04W 76/14* (2018.01)
*H04W 12/04* (2009.01)
*H04L 9/14* (2006.01)
*H04W 84/18* (2009.01)
*H04W 4/80* (2018.01)

(52) U.S. Cl.
CPC ... *H04W 12/0401* (2019.01); *H04W 12/0407* (2019.01); *H04W 12/0609* (2019.01); *H04W 76/14* (2018.02); *H04L 2209/80* (2013.01); *H04W 4/80* (2018.02); *H04W 84/18* (2013.01)

(58) Field of Classification Search
CPC ......... H04L 9/30; H04L 63/06; H04L 9/0822; H04L 9/0844; G06F 21/606; G06F 21/44; G06F 21/31
USPC ......... 709/221, 222, 230–233; 713/168–171, 713/181, 182; 726/4–5, 9–10, 17, 19, 21
See application file for complete search history.

(56) References Cited

U.S. PATENT DOCUMENTS

| | | | | |
|---|---|---|---|---|
| 8,285,994 B2* | 10/2012 | Shah | ...................... | H04L 9/3215 713/171 |
| 8,296,832 B2* | 10/2012 | Atwood | ................. | G06Q 40/12 726/7 |
| 8,893,246 B2* | 11/2014 | Jover Segura | .......... | H04L 63/18 726/7 |
| 9,049,303 B2* | 6/2015 | Jensen | .................. | H04M 1/725 |
| 9,119,072 B2* | 8/2015 | Du | ........................ | H04W 12/04 |
| 9,135,430 B2* | 9/2015 | Callaghan | .............. | H04L 9/3263 |
| 9,429,992 B1* | 8/2016 | Ashenbrenner | ...... | G06F 13/4081 |
| 2004/0198430 A1* | 10/2004 | Moriyama | ................. | G06F 3/14 455/556.1 |
| 2004/0215808 A1* | 10/2004 | Homma | ..................... | H04L 5/14 709/232 |
| 2005/0044372 A1* | 2/2005 | Aull | ......................... | H04L 67/04 713/176 |
| 2005/0152294 A1* | 7/2005 | Yu | ........................ | H04M 1/7253 370/310 |
| 2009/0213752 A1* | 8/2009 | Butti | .................... | H04L 61/2015 370/254 |
| 2009/0327724 A1* | 12/2009 | Shah | ...................... | H04L 9/3271 713/169 |
| 2010/0250952 A1* | 9/2010 | Pang | ................... | G06Q 20/3823 713/176 |
| 2011/0191833 A1* | 8/2011 | Yi | ....................... | G07C 9/00857 726/5 |
| 2011/0210831 A1* | 9/2011 | Talty | .................... | H04B 5/0031 340/10.51 |
| 2011/0298736 A1* | 12/2011 | Madonna | ............... | G06F 1/1632 345/173 |
| 2012/0071134 A1* | 3/2012 | Jensen | .............. | H04M 1/72505 455/411 |
| 2014/0120839 A1* | 5/2014 | Lam | .................... | H04M 1/0283 455/41.2 |
| 2014/0196142 A1* | 7/2014 | Louboutin | ............ | H04W 12/08 726/16 |
| 2014/0282896 A1* | 9/2014 | Torgersrud | ............... | H04W 4/12 726/4 |
| 2016/0285299 A1* | 9/2016 | Amand | .................... | H02J 7/025 |
| 2018/0049722 A1* | 2/2018 | Uno | ........................ | H04W 12/003 |

\* cited by examiner

AUTHENTICATION OF BASE STATION AND HEADSET

TECHNICAL FIELD

The disclosure relates to an authentication process between two communication devices by combining a non-physical connection and a physical connection.

BACKGROUND

A communication between two communication devices is ensured by an authentication process prior to a pairing process. It is known to provide the authentication process over a wired charging interface between two communication devices. The wired charging interface is made to ensure a safe authentication process, however, the disadvantage of this safe authentication process is that it is slow.

Furthermore, it is known to provide an authentication process via a wireless interface between two communication devices having the advantage of a faster authentication process compared to the wired authentication process. However, in an office environment with multiple communication devices, there will be a risk of cross authentication between multiple communication devices.

There is a need to provide a solution that addresses at least some of the above-mentioned problems.

SUMMARY

An object of the present disclosure is to provide an authentication process which has an improved security compared to the known wireless authentication process and which has a faster authentication process compared to the known wired authentication process.

A further object of the present disclosure is to provide an authentication process which is simple and more cost efficient to implement.

An object of the present disclosure is achieved by a communication system for authenticate a second communication device to a first communication device, wherein the communication system comprises a physical connection between a first communication device and a second communication device, where a first message may be transmitted from the first communication device, via the physical connection, to the second communication device. Furthermore, the communication system comprises a non-physical connection between the first communication device and the second communication device, where a second message may be transmitted from the first communication device, via the non-physical connection, to the second communication device, and wherein the second communication device may be configured to evaluate the first message and the second message based on a matching criteria, and if the evaluation of the first message and the to second message fulfills the matching criteria then the second communication device may be configured to transmit an acceptance to the first communication device.

It is an advantage that the authentication of the second communication device to the first communication device is provided via a physical connection and a non-physical connection, since the security in the authentication is improved, compared to the known wireless authentication process, and the speed of the authentication is improved compared to the known wired authentication process.

By having the physical connection between the two communication devices in combination with the non-physical connection, and the comparing of the first message and the second message, makes the present disclosure less vulnerable to an attack on the security, such as a "man-in-the middle" attack, a "replay attack", and "eavesdropping."

A "man-in-the-middle" attack (MITI, MitM, MIM, MiM or MITMA) is an attack where the attacker secretly relays and possibly alters the communication between two parties, e.g. between the first communication device and the second communication device, who believes they are directly communicating with each other.

A "replay attack" (also known as playback attack) is a form of network attack in which a valid data transmission may be maliciously or fraudulently repeated or delayed. This may be carried out either by the originator or by an adversary who intercepts the data and retransmits it, possibly as part of a masquerade attack by IP packet substitution (such as stream cipher attack).

"Eavesdropping" is secretly listening to a private conversation of others, e.g. between the first communication device and the second communication device. In order to eavesdropping between the first and the second communication device a third communication device has to be connected physically to the first communication device in order to gain access to the conversation between the first and the second communication device.

In one or more embodiments, the second communication device, i.e. the communication device being the first to be authenticated by the first communication device, may furthermore accept the third communication device gaining access to the conversation between the second communication device and the first communication device.

In one or more embodiments, the first communication device, i.e. a base station, may be a communication device which may be a transceiver connecting a number of other communication devices, e.g. a second communication device and a third communication device, to one another and/or to a wider area via a telephone network, a near-range network or a long-range network.

In or more embodiments, the second communication device and the third communication device may be a hearing device, including a speaker (or a receiver) and a microphone. The hearing device may be a headset or a hearing aid device configured to receive the voice of the user of the hearing aid device.

Additionally, the second communication device may be a smartphone, a tablet, a hearing aid device, a PC or a cellphone.

Furthermore, the present disclosure is implemented in a simple and cost efficient way.

The purpose of authentication between at least two communication devices is to prevent unauthorized access to a communication between the at least two communication devices, i.e. the authentication is needed to ensure the security of the communication between the at least two communication devices. The authentication may be configured to an authentication protocol which at least involves two or more communication devices, and each of the involved communication devices needs to know the authentication protocol.

The authentication protocol may for example be a Point-to-Point authentication protocol (PPP) exchanging a password which has to be known by the communication devices attending the communication. In one or more embodiments, the first message and the second message may comprise the password.

Furthermore, the authentication protocol may be a Password Authentication Protocol (PAP), where the at least second communication device transmits its credentials, e.g. password and username, to the at least first communication device.

In known communication systems the PAP solution may not be preferred since it is vulnerable even to the most simple attacks like Eavesdropping and man-in-the-middle based attacks. However, in the present disclosure, the physical connection prevents these kind of attacks. Thereby, this simple authentication protocol is suitable in the present disclosure.

Additionally, the authentication protocol may be a Challenge-Handshake authentication protocol (CHAP). The authentication process in this protocol may always by initialized by, e.g. the first communication device and can be performed anytime during the authentication, even repeatedly. The first communication device may send a random data string (usually 128 bite long). The second communication device may use his password and the data string received as parameters for, e.g. a message-digest algorithm (MD2, MD4, MD5, MD6) hash function (i.e. a cryptographic hash function), and then sends the result, i.e. the password applied with the cryptographic hash function, together with username in plain text. The first communication device uses the username to apply the same hash function and compares the calculated and received hash. An authentication is successful or unsuccessful.

Alternative, the authentication protocol may be an Extensible Authentication Protocol (EAP), such as EAP-MD5 (message digest 5), EAP-TLS (Transport Layer Security), EAP-TTLS (Tunneled Transport Layer Security), EAP-FAST (Flexible Authentication via Secure Tunneling), or EAP-PERP (Protected Extensible Authentication Protocol).

The physical connection may be a wired connection or a wired charging interface being s one-way or a two-way wired interface.

The non-physical connection may be a near-field wireless connection, comprising a BLUETOOTH® wireless communication link, a DECT link (Digital Enhanced Cordless Telecommunications) or a WI-FI link (wireless fidelity network).

The first message and/or the second message may comprise an identity information of the first communication device, where the identity information may be an IP address, a DECT number, a BLUETOOTH number, or a serial number of the first communication device.

Alternatively or additionally, the first message and/or the second message may comprise information regarding a specific country which the first communication device is configured to. For example, the first communication device may add bit values to the first message and/or the second message indicating the country of which the first communication device is configured to.

The advantage is that when the second communication device has paired with the first communication device, the second communication device may easily find a call signal from the first communication device since the second communication device do not need to search for the call signal in each country.

The evaluation of the first message and the second message, in the second communication device, includes comparing the first message with the second message, and if the comparing fulfils the matching criteria the first message is identical to the second message.

Alternatively, the first message may comprise a first part of the identity information and the second message may comprise a second part of the identity information. In the second communication device, the evaluation of the first message and the second message includes comparing the first message with the second message, and if the comparing fulfils the matching criteria the first message deviates from the second message according to a decoding scheme stored in the second communication device.

Alternatively, the evaluation of the first message and the second message includes combining the first message with the second message, resulting in a first identification key, and if the first identification key fulfils the matching criteria the first identification key matches a second identification key which is a result of a key algorithm processed in the second communication device.

Alternatively, the first message may comprise a first part of the identity information and the second message may comprise a second part of the identity information. The second communication device may be configured to evaluate the first message and the second message, including combining the first message and the second message and transmitted back to the first communication device as an acceptance to the first communication device. The First communication may then be configured to evaluate whether the first message and the second message has been received by the second communication device, and not by an unwanted communication device, and thereby, the first communication initiates a pairing process between the first communication device and the second communication device.

The acceptance transmitted from the second communication device to the first communication device may be a combination of the first message and the second message, and/or a specific message stating that the second communication accepts an invitation to be paired with the first communication device.

The first communication device may be configured to encrypt the first message and the second message before transmitting the first message and/or the second message to the second communication device. The second communication device may then be configured to decrypt the first message and/or the second message with an encryption key stored in the second communication device, or the encryption key has been generated by a processing unit in the second communication device based on the first message and/or the second message, or the encryption key is transmitted to the second communication device via the physical connection.

In one or more embodiments, it is obvious that the first communication device and the second communication device comprise at least a processing unit and a memory unit.

A further object of the present disclosure is achieved by a method of authenticating a second communication device to a first communication device, wherein said method comprising:

transmitting a first message via a first physical connection from a first communication device to a second communication device, transmitting a second message via a first non-physical connection from the first communication device to the second communication device, evaluating on the second communication device the first message and the second message based on a matching criteria, and wherein if the evaluation of the first message and the second message fulfills the matching criteria then the second communication device may be configured to transmit an acceptance to the first communication device.

The first physical connection may be a wired charge interface or a wired interface between the first communication device and the second communication device.

The transmitting of the first message via the first physical connection includes a low speed one way data protocol. The physical connection having a low speed one way data protocol has the advantage of being configured for both charging and for authentication.

The second message may be transmitted via the non-physical connection and a second physical connection from the first communication device to the second communication device. The second physical connection, which may be a wired interface or a wired charging interface, may be used for applying an extra security layer to the communication system comprising a single physical connection. The extra security layer improves the security even more, since the second physical connection can be used for transmitting the second identification key or the decoding scheme from the first communication device to the second communication device, and thereby, avoiding that the second communication device has to have a pre-stored second identification key or a decoding scheme.

The second physical connection may transfer the first message with a first hit rate being either higher or equal to a second bit rate of the non-physical connection. Thereby, this second physical connection does not apply a delay to the communication device having a single physical connection.

The non-physical connection may be a wireless communication link, such as a DECT wireless radio-frequency communication link, a BLUETOOTH communication link or a WIFI communication link or near-field communication link.

The transmitting of the second message to the second communication device may be provided via a second non-physical connection, being a second wireless communication link, in an external device being physical connected to the first communication device, and wherein the second wireless communication link may be a DECT wireless radio-frequency communication link or a BLUETOOTH communication link.

The transmitting of the second message may either be done via the first non-physical connection or the second non-physical connection or in both non-physical connections.

The second non-physical connection may be a wireless communication link, such as a DECT wireless radio-frequency communication link, a BLUETOOTH communication ink or a WIFI communication link or near-field communication link.

The second non-physical connection may be used for applying an extra security layer to the communication system, comprising a single non-physical connection. The extra security layer improves the security even more, since the second non-physical connection may be used for transmitting the second identification key or the decoding scheme from the first communication device to the second communication device, and the second communication device is configured to evaluate the incoming messages, i.e. the first message and the second message, and extract a third message based on the second identification key or the decoding scheme. The third message is transmitted to the first communication device as an acceptance to be paired. The first communication device is configured to evaluate the third message whether it is a valid or an invalid message.

For example, the content of the third message may be evaluated by comparing the third message with an authentication key which the first communication device 2 either requests from a server, via a telephone network, a near-range network or a long-range network, or the authentication key has been stored on the first communication device 2.

The advantage of above example is that a pre-stored second identification key or a pre-stored decoding scheme on the second communication device is avoided.

Furthermore, the second non-physical connection may be used for transmitting a third message to the second communication device, wherein the third message may be used for evaluating the first message and the second message.

The second non-physical connection or a third non-physical connection may be between the second communication device and an external device wired connected to the first communication device, and wherein the second non-physical connection (or the third non-physical connection) may comprise a DECT wireless radio-frequency communication link, a WIFI link or a BLUETOOTH communication link.

The external device may be a USB dongle connected to the first communication device, wherein the USB dongle comprises a wireless interface, such as BLUETOOTH, DECT or WIFI.

The first communication device may be a base station, and the second communication device may be a headset, a smartphone, a tablet, a PC or a cellphone.

A pairing process may be initialized after the first communication device has received the acceptance from the second communication device. The pairing process may be a standard or a customized DECT, WIFI or BLUETOOTH pairing process.

The first physical connection may be a wired charge interface or a wired interface between the first communication device and the second communication device, and/or wherein the first non-physical connection may be a wireless communication link, such as a DECT wireless radio-frequency communication link, a BLUETOOTH communication link or a near-field communication link.

The transmitting of the first message via the first physical connection includes a low speed one way data protocol, a high speed one way data protocol, or a high speed two way data protocol.

The second physical connection may be a wired interface transferring the first message with a first bit rate being either higher or equal to a second bit rate of the non-physical connection.

The transmitting of the second message to the second communication device may be provided, via a second non-physical connection or a third non-physical connection, from an external device wired connected to the first communication device, and wherein the second non-physical connection (or the third non-physical connection) may comprise a DECT wireless radio-frequency communication link, a WIFI link or a BLUETOOTH communication link.

The external device may be a USB dongle connected to the first communication device, wherein the USB dongle comprises a wireless interface, such as BLUETOOTH, DECT or WIFI.

The security level of the communication system may be improved even more by applying the external device to the first communication device, since an extra non-physical connection is applied to the communication system, or the first communication device may be able to pair with a second communication device via a wireless link which the second communication device and the external device support.

The first communication device comprises a decryption unit and a user authentication key, where the first communication device is configured to transmit the user authentication key via the physical connection to the second communication device, and wherein the second communication device comprises an encryption unit which is configured to use the authentication key for encrypting a voice signal generated by the second communication device and transmitted to the first communication device via the non-physical connection, and where the first communication device is configured to use the user authentication key for decrypting the received encrypted voice signal in the decryption unit.

In order to improve the security of wireless communication of data/payload, for example DECT communication, a user authentication key may be transmitted via the physical connection from the first communication device to the second communication device during authentication of the second communication device to the first communication device. The second communication device uses the authentication key for encrypting the data/payload (i.e. the voice signal) being transmitted between the first communication device and the second communication device. The first communication device may then be configured to use the user authentication key for decrypting the received encrypted data/payload.

Both the first communication device and the second communication device are configured to encrypt and decrypt based on the user authentication key generated by the first communication.

The user authentication key may be calculated randomly in a processing unit within the first communication device.

The user authentication key may be transmitted before or after the second communication device has transmitted an acceptance to the first communication device. In one example, the user authentication key transmitted after the transmission of the acceptance may only be allowed if the evaluation of the first message and the second message has fulfilled a matching criteria.

The first message and the second message are transmitted via the physical connection and the non-physical connection, respectively, and the user-authentication key may be used for encrypting the first message and the second message.

By transmitting the user authentication key via the physical connection improves the security since the person wanting to attack or hack the communication has to be physical present in order to receive the user authentication key. To begin a call between both communication devices, the respective communication devices have to accept each other based on inter-changing and comparing the user authentication key stored in the first and second communication device. If a match between the user authentication key received and stored within both communication devices the call can begin.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1A:
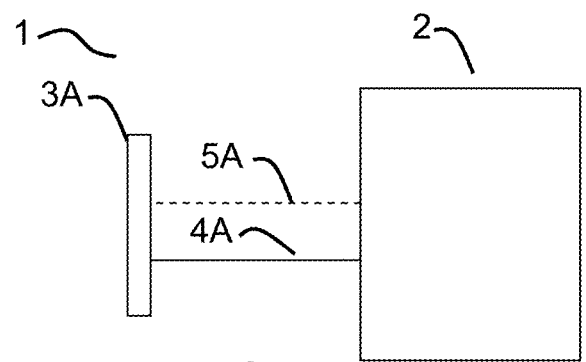
FIGS. 1A-1D, show different examples of the communication system.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing device" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

In general, a hearing device includes i) an input unit such as a microphone for receiving an acoustic signal from a user's surroundings and/or the user's own voice and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

The input unit may include multiple input microphones, e.g. for providing direction-dependent audio signal processing. Such directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include amplifier that is adapted to apply a frequency dependent gain to the input audio signal. The signal processing unit may further be adapted to provide other relevant functionality such as compression, noise reduction, etc.

FIGS. 1A-1D show different examples of the communication system 1. FIG. 1A shows a communication system 1 where a second communication device 3A is authenticated to a first communication device 2. The communication system 1 comprises a physical connection 4A between a first communication device 2 and a second communication device 3A, where a first message may be transmitted from the first communication device 2, via the physical connection 4A, to the second communication device 3A. Furthermore, the communication system 1 comprises a non-physical connection 5A between the first communication device 2 and the second communication device 3A, where a second message may be transmitted from the first communication device 2, via the non-physical connection 5A, to the second communication device 3A, and wherein the second communication device 3A may be configured to evaluate the first message and the second message based on a matching criteria, and if the evaluation of the first message and the second message fulfills the matching criteria then the second communication device 3A may be configured to transmit an acceptance to the first communication device 2.

Figure 1B:
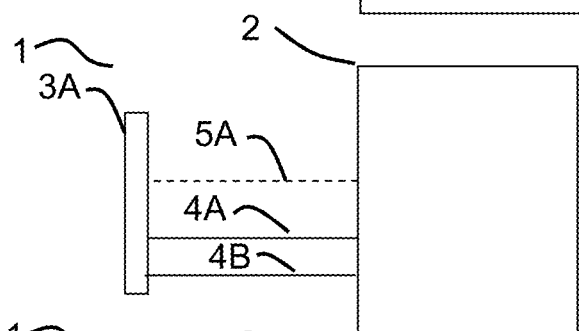

FIG. 1B shows the communication system 1, as illustrated in FIG. 1A, with a second physical connection 4B between the first communication device 2 and the second communication device 3A. In this particular example, the second message may be transmitted, via the non-physical connection 5A and the second physical connection 4B, from the first communication device 2 to the second communication device 3A. The second physical connection 4B, which may be a wired interface or a wired charging interface, may be used for applying an extra security layer to the communication system 1 comprising a single physical connection, illustrated in FIG. 1A. The extra security layer improves the security even more, since the second physical connection 4B can be used for transmitting a second identification key or a decoding scheme from the first communication device 2 to the second communication device 3A, and thereby, avoiding that the second communication device 2 has to have a pre-stored second identification key and/or a decoding scheme.

The second identification key and/or the decoding scheme may be stored in the first communication device 2 or provided to the first communication device 2 from a server or a cloud server via a telephone network, a near-range network or a long-range network.

Figure 1C:
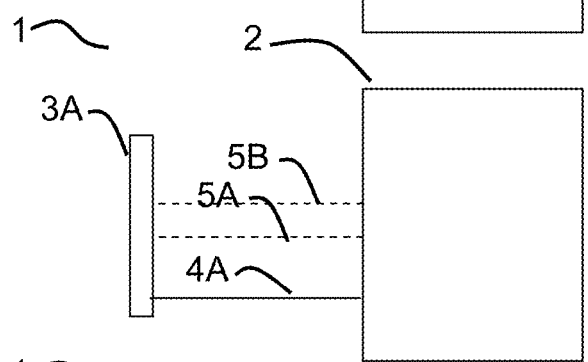

FIG. 1C shows the communication system 1, as illustrated in FIG. 1A, with a second non-physical connection 5B between the first communication device 2 and the second communication device 3A. In this particular example, the transmitting of the second message may either be done via the first non-physical connection 5A or the second non-physical connection 5B or in both non-physical connections 5A, 5B).

The second non-physical connection 5B may be a wireless communication link, such as a DECT wireless radio-frequency communication link, a BLUETOOTH communication link or a WIFI communication link or near-field communication link.

The second non-physical connection 5B may be used for applying an extra security layer to the communication system 1, comprising a single non-physical connection. The extra security layer improves the security even more, since the second non-physical connection 5B may be used for transmitting a second identification key or a decoding scheme from the first communication device 2 to the second communication device 3A, and the second communication device 3A may be configured to evaluate the incoming messages, i.e. the first message and the second message, and extract a third message based on the second identification key or the decoding scheme. The third message is transmitted to the first communication device 2 as an acceptance to be paired. The first communication device 2 is configured to evaluate the third message whether it is a valid or an invalid message.

For example, the content of the third message may be evaluated by comparing the third message with an authentication key which the first communication device 2 either requests from a server, via a telephone network, a near-range network or a long-range network, or the authentication key may be pre-stored on the first communication device 2.

The advantage of above example is that a pre-stored second identification key or a pre-stored decoding scheme on the second communication device 3A is avoided.

Furthermore, the second non-physical connection 5B may be used for transmitting a third message to the second communication device 2, wherein the third message may be used for evaluating the first message and the second message.

Figure 1D:
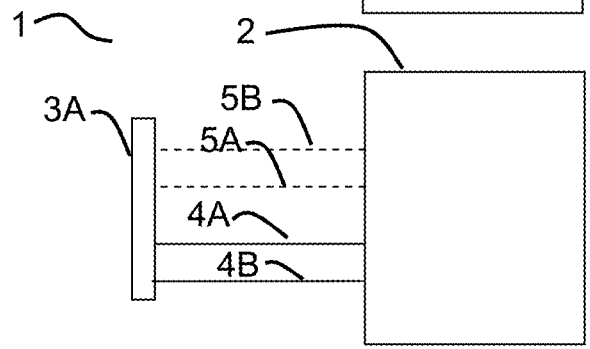
Figure 2A:
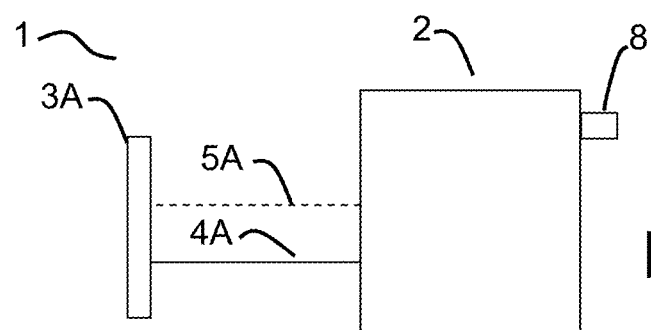
FIGS. 2A-2D, show a flow diagram of the first communication device and the second communication device, respectively.
Figure 2B:
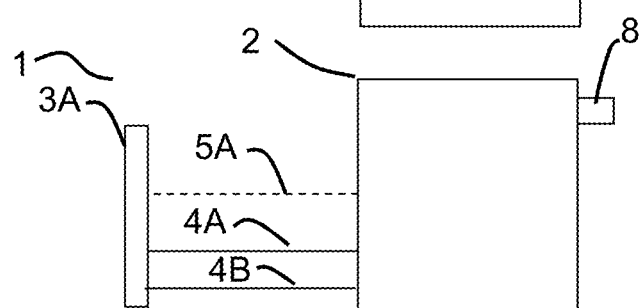
Figure 2C:
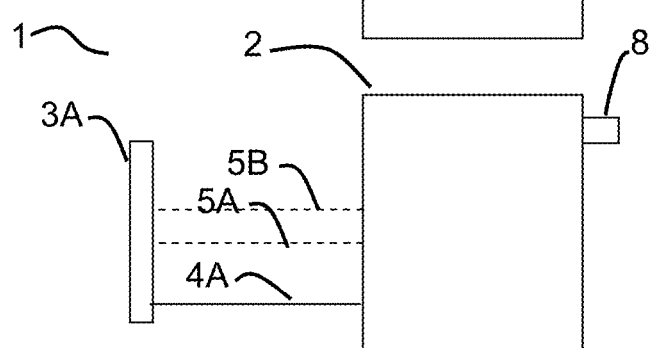
Figure 2D:
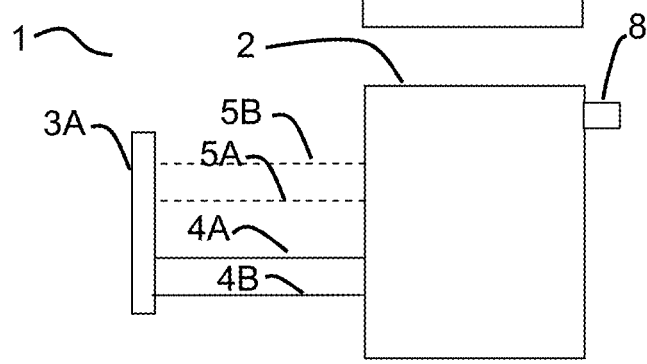

FIG. 1D shows the communication system 1, as illustrated in FIG. 1A-1C, but in this example both the second physical connection 4B and the second non-physical connection 5B are applied to the communication system 1 between the first communication device 2 and the second communication device 3A.

The communication system, illustrated in FIG. 1D has the same advantages and functionalities as the communication systems illustrated in FIGS. 1A-1C.

FIGS. 2A-2D shows the communication system 1, as illustrated in FIGS. 1A-1D, with an external device 8 connected to the first communication device 2. The first 5A, the second 5B or a third 5C non-physical connection may be provided by the external device 8. In one or more of the non-physical connections (5A-5C) may be provided by the external device 8.

In one example, the transmitting of the second message to the second communication device 3A may be provided via a second non-physical connection 5B, being a second wireless communication link, in the external device 8 being physical connected to the first communication device 2, and wherein the second wireless communication link may be a DECT wireless radio-frequency communication link or a BLUETOOTH communication link.

The external device 8 may be an USB dongle connected to the first communication device 2, wherein the USB dongle comprises a wireless interface, such as BLUETOOTH, DECT or WIFI.

The security level of the communication system may be improved even more by applying the external device to the first communication device, since an extra non-physical connection is applied to the communication system, or the first communication device may be configurable to be able to pair with a second communication device which only supports a wireless interface which the external device supports.

Figure 3:
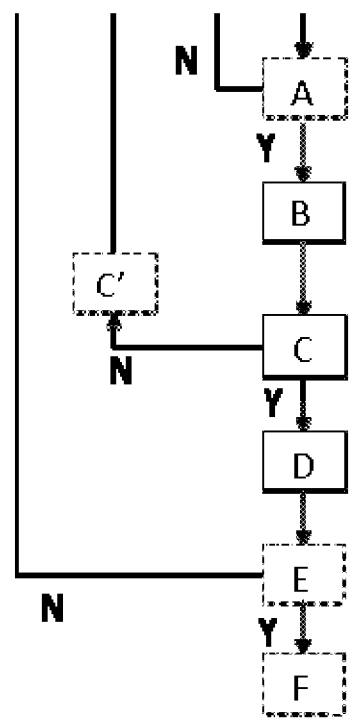
FIG. 3 shows a flow diagram of the authentication between a first communication device and a second communication device.

FIG. 3 shows a flow diagram describing the authentication process between the first communication device 2 and the second communication device 3A:

Step A (not essential): Initiating the authentication by the first communication device 2 sensing that the physical connection 4A is established to the second communication device 3A.

Step B: transmitting a first message and a second message from the first communication device 2 to the second communication device 3A, via the physical connection 4A and a non-physical connection 5A, respectively, if the first communication device 2 is connected to the second communication device 3A, Step C: Evaluating the first message and the second message in the second communication device 3A, Step C' (not essential): returning back to step A if the evaluation of the first message and the second message did not fulfil the matching criteria, Step D: transmitting an acceptance from the second communication device 3A to the first communication device 2, Step E (not essential): receiving an acceptance from the second communication 3A. If the first communication device 2 did not receive any acceptance from the second communication 3A during a time interval, e.g. a time interval defining when the first communication device 2 expects receiving the acceptance from the second communication device, then the authentication starts again from step A.

Step F (not essential): initiating a pairing process between the first communication device 2 and the second communication device 3A when receiving the acceptance from the second communication device 3A.

In the authentication between the first communication device 2 and the second communication device 3A step A, C', E and F are not essential.

Figure 4:
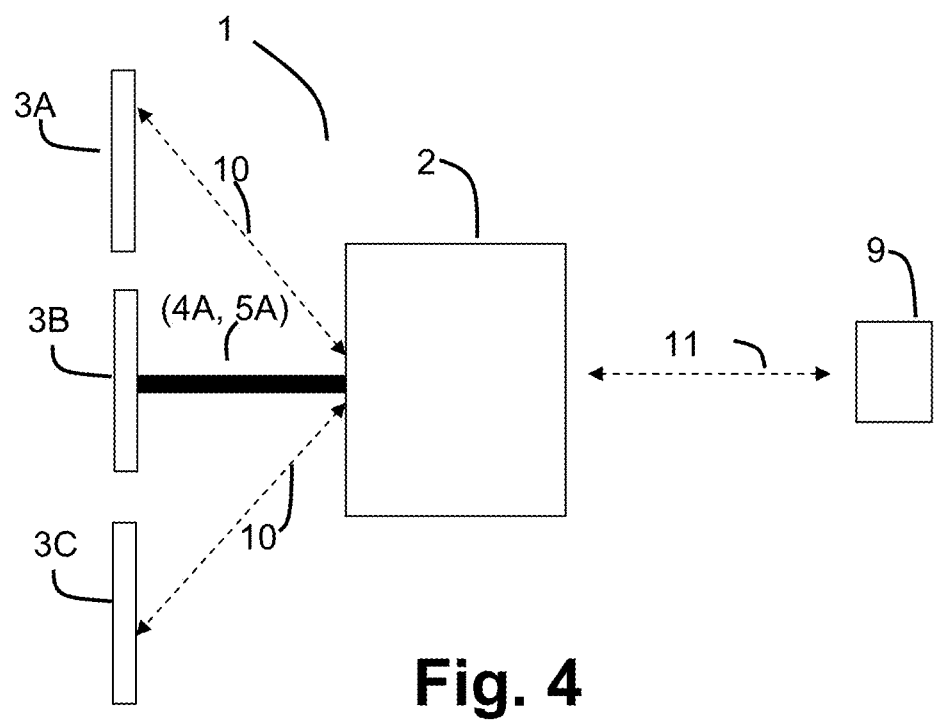
FIG. 4 shows an example of the communication system.

FIG. 4 shows an example of a communication system 1 in a communication situation where a second primary communication device 3A, a second secondary communication device 3B and a second tertiary communication device 3C are communicating 10 via a first communication device 2 and a telephone network 11 or a long-range network 11 to another communication device 9.

In another example, multiple second communication devices 3X may communicate 10 via the first communication device 2 and a telephone network 11 or a long-range network 11 to one or more another communication devices 9.

In this particular example, the second primary communication device 34 and the second tertiary communication device 3C have been paired with the first communication device 2 and communicating (10 and 11) with the another communication device 9. The second secondary communication device 3B is joining the communication (10 and 11) by establishing one or more physical connections 44 to the first communication device 2, and one or more non-physical connections 5A are established automatically between the first communication device and the second secondary communication device 3B, and thereby the authentication and the pairing can begin.

Figure 5A:
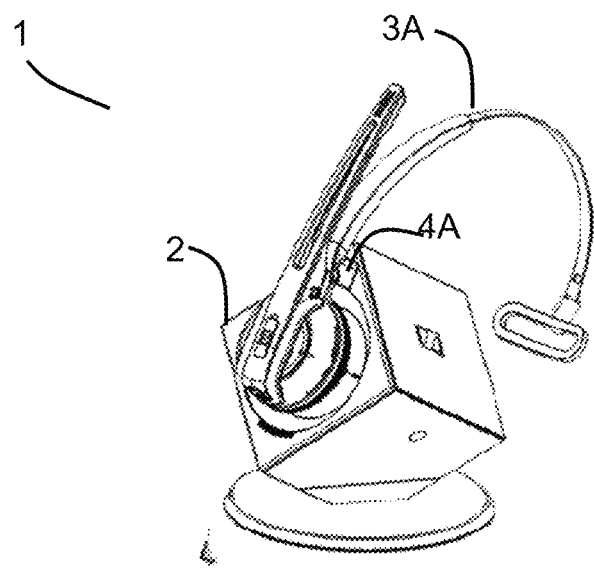
FIGS. 5A-5B, show different examples of the communication system.
Figure 5B:
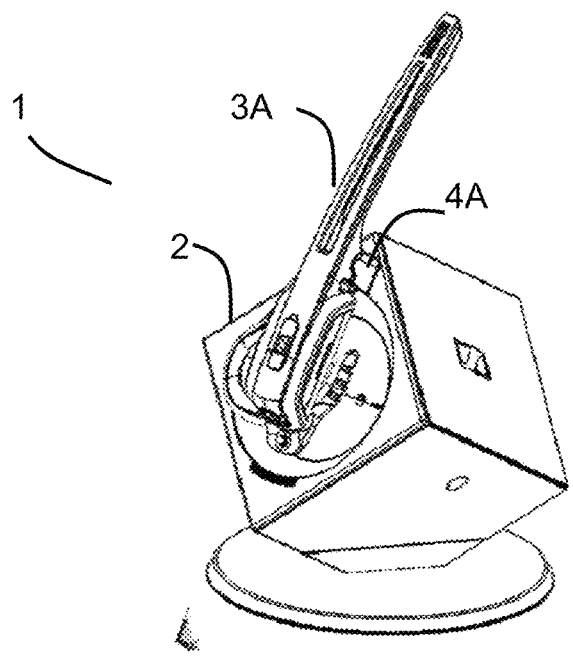

FIGS. 5A-5B show an example of the communication system 1, wherein the first communication system is a base station and the second communication device is a headset with and without a headband. In this particular example, the physical connection 44 is provided via the wired charging interface. The non-physical connection 5B is not shown in FIGS. 5A and 5B.

Figure 6A:
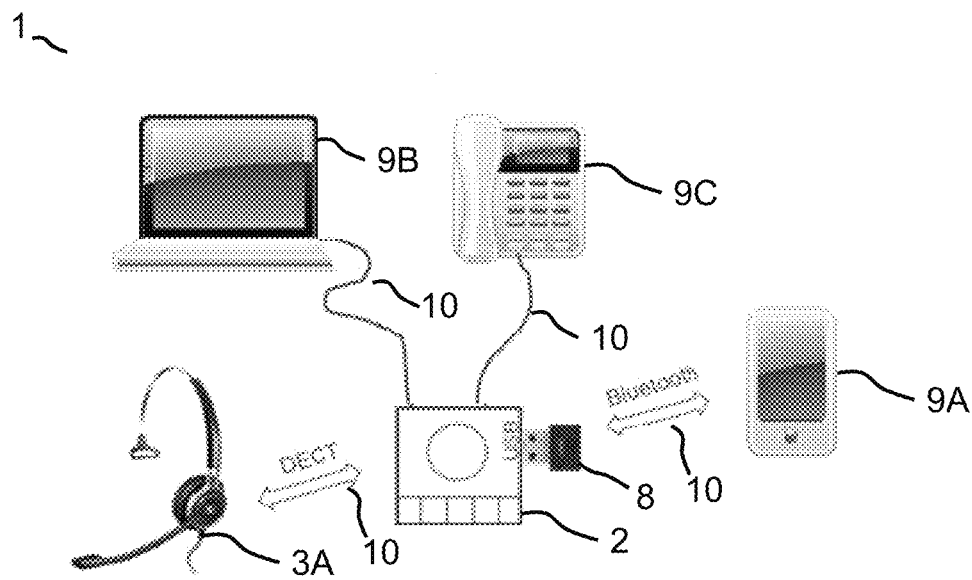
FIGS. 6A-6B, show the communication system in different use scenarios.
Figure 6B:
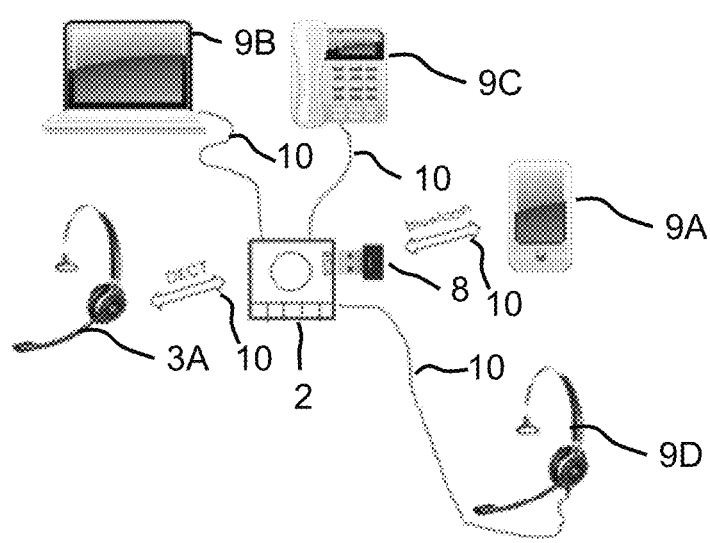

FIG. 6A-6B show different use scenarios of the communication system 1. In FIG. 6A the first communication device 2 is a base station 2 wherein a second communication device 3A communicates 10 with the base station 2 after the pairing via a DECT link. An USB dongle has been inserted to the base station 2 so that a BLUETOOTH communication link 10 is established between the base station 2 and a smartphone 9A. Optionally, a PC 9B and a wired telephone 9C (with or without Electronic Hook Switch (EHS)) are wired connected to the base station. The PC 9B may for example communicate 10 via a telephone call software, such as SKYPE, to the base station 2 via a wired connection. The wired telephone 9C communicates 10 to the base station 2 via another wired connection.

FIG. 6B shows the use scenario illustrated in FIG. 6A including a headset 9D wired connected to the base station 2, where the headset communicates 10 via the wired connection.

Figure 7:
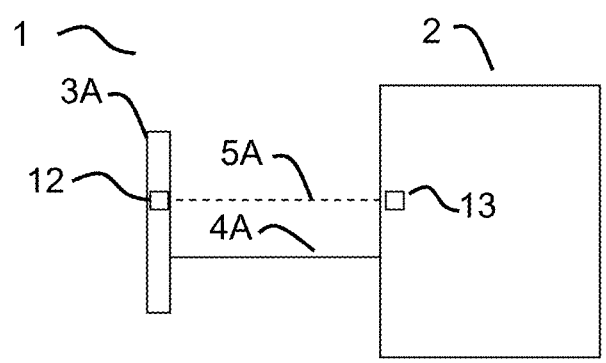
FIG. 7, shows an example of the communication system.

FIG. 7 shows a communication system 1 where a second communication device 3A is authenticated to a first communication device 2. The communication system 1 comprises a physical connection 4A between a first communication device 2 and a second communication device 3A, where a first message may be transmitted from the first communication device 2, via the physical connection 4A, to the second communication device 3A. Furthermore, the communication system 1 comprises a non-physical connection 5A between the first communication device 2 and the second communication device 3A, where a second message may be transmitted from the first communication device 2, via the non-physical connection 5A, to the second communication device 3A, and wherein the second communication device 3A may be configured to evaluate the first message and the second message based on a matching criteria, and if the evaluation of the first message and the second message fulfills the matching criteria then the second communication device 3A may be configured to transmit an acceptance to the first communication device 2.

The second communication device 3A further comprises an encryption unit 12 and the first communication system 2 further comprises a decryption unit 13. The first communication device 2 further comprises a user authentication key, where the first communication device 2 is configured to transmit the user authentication key via the physical connection 4A to the second communication device 3A, and wherein the encryption unit 12 is configured to use the authentication key for encrypting a voice signal generated by the second communication device 3A and transmitted to the first communication device 2 via the non-physical connection 5A, and where the first communication device 2 is configured to use the user authentication key for decrypting the received encrypted voice signal in the decryption unit 13.

| | |
|---|---|
| 1 | Communication device |
| 2 | First communication device |
| 3A | Second (primary) communication device |
| 3X | Multiple second communication devices |
| 3B | Second secondary communication device |
| 3C | Second tertiary communication device |
| 4A | Physical connection |
| 4X | Multiple physical connections |
| 4B | Second physical connection |
| 4C | Third physical connection |
| 5A | Non-physical connection |
| 5X | Multiple non-physical connection |
| 5B | Second non-physical connection |
| 5C | Third non-physical connection |
| 6 | Wireless communication |
| 7 | A second communication system or another communication device located |
| 8 | External device |
| 9 | Another communication device |
| 9A | First another communication device |
| 9B | Second another communication device |
| 9C | Third another communication device |
| 9D | Fourth another communication device |
| 10 | communicating |
| 11 | Telephone network or long-range network |
| 12 | Encryption unit |
| 13 | Decryption unit |

The invention claimed is:

1. A communication system for authenticated communications between a second communication device and a first communication device, wherein the communication system comprises:

a first physical connection established between the first communication device and the second communication device prior to performing authentication between the first and second communication devices, wherein the first communication device to transmits a first message from the first communication device over the first physical connection to the second communication device and wherein the first physical connection is a wired charge interface between the first communication device and the second communication device, a non-physical connection established between the first communication device and the second communication device prior to performing the authentication between the first and second communication devices, wherein the first communication device transmits a second message from the first communication device over the non-physical connection to the second communication device while the first physical connection is established between the first and second communication devices, wherein the second communication device to compares the first message transmitted over the first physical connection to the second message transmitted over the non-physical connection based on a matching criteria, and if the comparison of the first message to the second message is determined by the second communication device to fulfill the matching criteria then the second communication device transmits an acceptance to conduct authenticated communications with the first communication device, wherein the first communication device transmits a user authentication key via the first physical connection to the second communication device before the second communication has transmitted the acceptance to conduct authenticated communications with the first communication device, the user authentication key being used by the first communication device to encrypt the first message and the second message that are transmitted via the first physical connection and the non-physical connection, respectively, and wherein the first communication device comprises a decryption unit, and wherein the second communication device comprises an encryption unit which uses the authentication key for encrypting the first message and/or the second message generated by the second communication device and transmitted to the first communication device via the non-physical connection, and where the first communication device uses the user authentication key for decrypting the received encrypted first message and/or second message in the decryption unit.

2. A communication system according to claim 1, wherein the transmitting of the first message via the first physical connection includes a low speed one way data protocol.

3. A communication system according claim 2, wherein the communication system comprises a second physical connection from the first communication device to the second communication device, where the second message is transmitted from the first communication device, via both the non-physical connection and the second physical connection, to the second communication device.

4. A communication system according to claim 2, wherein the non-physical connection is a wireless communication link.

5. A communication system according to claim 1, wherein the communication system comprises a second physical connection between the first communication device and the second communication device, where the second message is transmitted from the first communication device, via both the non-physical connection and the second physical connection, to the second communication device.

6. A communication system according to claim 5, wherein the second physical connection is a wired interface transferring the second message with a first bit rate being either higher or equal to a second bit rate of the non-physical connection.

7. A communication system according to claim 1, wherein the non-physical connection is a wireless communication link.

8. A communication system according to claim 7, wherein the wireless communication link is a DECT wireless radio-frequency communication link, a BLUETOOTH® wireless communication link or a WIFI communication link or near-field communication link.

9. A communication system according to claim 1, wherein the communication system comprises an external device physical connected to the first communication device, wherein the external device provides the non-physical connection between the first communication device and the second communication device.

10. A communication system according to claim 1, wherein the first communication device is a base station.

11. A communication system according to claim 1, wherein the second communication device is a headset.

12. A communication system according to claim 1, wherein the first message and the second message include an identification of the first communication device.

13. A communication system according claim 1, wherein the communication system comprises a second physical connection from the first communication device to the second communication device, where the second message is transmitted from the first communication device, via both the non-physical connection and the second physical connection, to the second communication device.

14. A method of authenticating a first communication device to a second communication device, wherein said method comprising:
- transmitting by the first communication device a first message to the second communication device, the first communication device transmitting the first message over a first physical connection established between the first communication device and the second communication device prior to performing authentication between the first and second communication devices,
- while the first physical connection is established between the first and second communication devices, transmitting by the first communication device to the second communication device a second message over a first non-physical connection established between the first communication device and the second communication device prior to performing the authentication between the first and second communication devices, and wherein the first physical connection is a wired charge interface between the first communication device and the second communication device, and
- comparing by the second communication device the first message transmitted over the first physical connection and the second message transmitted over the first non-physical connection based on a matching criteria,
- wherein if the comparison of the first message to the second message is determined by the second communication device to fulfill the matching criteria then the second communication device transmits an acceptance to conduct authenticated communications with the first communication device,
- wherein a user authentication key is transmitted by the first communication device via the first physical connection to the second communication device before the second communication has transmitted the acceptance to conduct authenticated communications with the first communication device, the user authentication key being used by the first communication device to encrypt the first message and the second message that are transmitted via the first physical connection and the non-physical connection, respectively, and
- wherein the second communication device uses the authentication key for encrypting the first message and/or the second message generated by the second communication device and transmitted to the first communication device via the non-physical connection, and where the first communication device uses the user authentication key for decrypting the received encrypted first message and/or second message.

15. A method according to claim 14, wherein a pairing process is initialized after the first communication device has received the acceptance from the second communication device.

16. A method according to claim 14, wherein the first physical connection is a wired charge interface or a wired interface between the first communication device and the second communication device, and/or wherein the first non-physical connection is a wireless communication link, such as a DECT wireless radio-frequency communication link, a BLUETOOTH® wireless communication link or a near-field communication link.

* * * * *